Patented Oct. 11, 1938

2,132,829

UNITED STATES PATENT OFFICE

2,132,829

DYESTUFFS OF THE ANTHRAQUINONE-NAPHTHACRIDONE SERIES AND PROCESS OF MAKING SAME

Wilhelm Moser, Riehen, near Basel, and Walter Fioroni, Binningen, near Basel, Switzerland, assignors to the firm of Society of Chemical Industry in Basle, Basel, Switzerland No Drawing. Application January 9, 1937, Serial No. 119,888. In Switzerland January 10, 1936

1 Claim. (Cl. 260—276)

This invention relates to the manufacture of new dyestuffs of the anthraquinone naphthacridone series by treating with a condensing agent an anthraquinone derivative which has at least 1 mol of the atom grouping

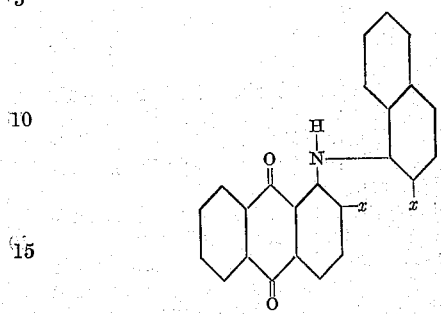

in which the one $x$ stands for hydrogen and the other $x$ for a COOR-group, OR being OH, O-alkyl or halogen. The new anthraquinonenaphthacridones thus produced contain at least once the atom grouping

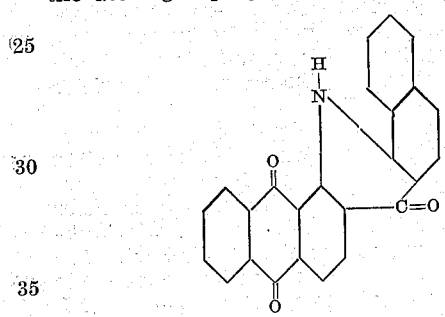

and are valuable dyestuffs or intermediate products for obtaining dyestuffs. These dyestuffs represent therefore the N-α:α'-anthraquinonenaphthacridones. The new dyestuffs are distinguished from the comparable naphthacridone dyestuffs by valuable properties, particularly by their levelling capacity. They are dark powders dissolving in sulfuric acid to orange, to brown, to olive and black-blue solutions, yielding with hydrosulfite and caustic soda solution, brown to brown-red, violet-red and Bordeaux red vats, and dyeing the vegetable fiber Bordeaux red to violet, to green, to grey and brown tints.

The compounds which contain at least once the atom grouping

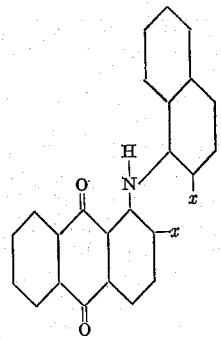

have not yet been described. They may be obtained by the known analogous processes, for example by condensing an aminoanthraquinone with an α-chlornaphthalene, the parent materials being so chosen that one of them contains in the β-position adjacent to the α-position a COOR-group (R representing H or alkyl).

Such compounds are, for example, the condensation products from 1-aminoanthraquinone-2-carboxylic acid ethyl ester and α-chlornaphthalene; 1 mol 1:4-diaminoanthraquinone and 2 mol 1-chloronaphthalene-2-carboxylic acid ethyl ester; 1 mol 1:5-diaminoanthraquinone and 2 mol 1-chloronaphthalene-2-carboxylic acid ethyl ester; 1 mol 1-amino-4-benzoylaminoanthraquinone and 1 mol 1-chloronaphthalene-2-carboxylic acid ethyl ester; 1 mol 1-amino-5-benzoylaminoanthraquinone and 1 mol 1-chloronaphthalene-2-carboxylic acid ethyl ester; the condensation product from 1 mol 1:4-dichloronaphthalene and 2 mol 1-aminoanthraquinone-2-carboxylic acid ethyl ester; the condensation product from 1 mol 4:4'-diamino-1:1'-dianthraquinonylamine and 2 mol 1-chloronaphthalene-2-carboxylic acid.

As condensing agents capable of converting the above compounds into acridone derivatives there come into question those which are used for similar reactions provided that they do not simultaneously have a sulfonating action. Such agents or processes are, for example, the treatment with reducing agents in the presence of alkalies, for instance vatting (if $x$ stands for a COOH-group or a COO-alkyl group); agents which convert the COOR-group into the CO-halogen group and then close the ring; agents which withdraw water or the like.

The new acridone derivatives which contain reactive groups may further be condensed with certain compounds, for instance the new acridone derivative of the formula

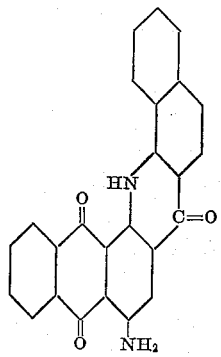

will react with compounds having reactive halogen atoms, for instance α-chloranthraquinones. The anthrimides thus obtained may then undergo further reactions which are characteristic of the anthrimides, for example they may be subjected to carbazolation. In spite of the presence of the carbazol ring the dyestuffs thus obtained belong to the N-α:α'-anthraquinonenaphthacridone. Particularly valuable among the N-α:α'-anthraquinonenaphthacridones are quite generally those which correspond to the general formula

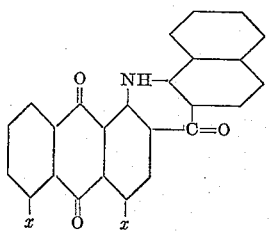

in which one $x$ stands for a hydrogen atom and the other $x$ stands for a NH-$y$ group, wherein $y$ represents a radical selected from the group of radicals consisting of aroyl radicals, anthraquinonyl radicals and the carbazolanthraquinonyl radicals deriving therefrom, which products are dark powders, dissolving in sulfuric acid to orange, to brown, to olive and black-blue solutions, yielding with hydrosulfite and caustic soda solution brown to brown-red, violet-red and Bordeaux red vats, and dyeing the vegetable fiber Bordeaux red to violet, to green, to grey and brown tints.

The new acridone derivatives may be halogenated, nitrated and subsequently reduced and if desired acylated, new dyestuffs being obtained. Acridone derivatives may be produced which in addition to the acridone grouping here characterized contain other acridone groupings.

The following examples illustrate the invention, the parts being by weight; the ratio of parts by weight to parts by volume is that which exists between the kilo and the litre:—

*Example 1*

39.3 parts of 1-α-naphthylaminoanthraquinone-2-carboxylic acid are introduced into a mixture of 400 parts of toluene and 13 parts of thionyl chloride. The mixture is heated to 50° C. and kept for 1 hour at 50–52° C., then heated under reflux and kept thus for ¼ hour. The whole is then filtered hot, the solid matter washed with toluene, alcohol and water and treated after separation of the undecomposed carboxylic acid with dilute caustic soda solution, then washed with hot water until neutral and dried. The dyestuffs thus obtained, which may be regarded as anthraquinone-2:2′:1:1′-naphthacridone of the formula

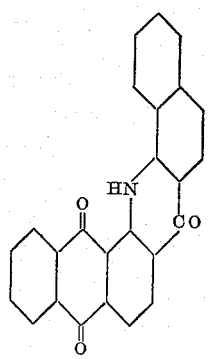

may be crystallized from nitrobenzene in crystals of Bordeaux colour which dye cotton Bordeaux in a violet vat. The solution in sulfuric acid is orange and when poured into water yields Bordeaux colored flocks.

The 1-α-naphthylaminoanthraquinone-2-carboxylic acid may be prepared as follows:

44 parts of 1-aminoanthraquinone-2-carboxylic acid ethyl ester, 24 parts of anhydrous sodium carbonate, 1.5 parts of anhydrous cupric chloride and 125 parts of 1-chloronaphthalene are together boiled under reflux for 4 hours; the mass is then distilled with steam, the residue filtered, the solid matter washed neutral with hot water, treated with hydrochloric acid, again washed until neutral and finally dried. The 1-α-napthylaminoanthraquinone-2-carboxylic acid ethyl ester is a dark violet powder soluble in sulfuric acid to an olive solution which on dilution with water yields red-brown flocks.

42 parts of 1-α-naphthylaminoanthraquinone-2-carboxylic acid ethyl ester are heated to boiling with 600 parts of alcohol and 15 parts of 30 per cent. sodium hydroxide solution for 1 hour under reflux and then filtered hot. The filtrate is diluted with water and the alcohol distilled. The solution is filtered from a little residue, the filtrate is acidified with hydrochloric acid and filtered; the solid matter is washed neutral and dried. The crude 1-α-naphthylaminoanthraquinone-2-carboxylic acid thus obtained may be purified, for example by extraction with alcohol. It behaves towards sulfuric acid as does the ester.

*Example 2*

10 parts of 1-(α₁-naphthylamino-β₁-carboxylic acid ethyl ester)-4-benzoylaminoanthraquinone ground wet are vatted in 600 parts of water by means of 30 parts of sodium hydroxide solution of 30 per cent. strength and 15 parts of sodium hydrosulfite for 1 hour at 65–70° C.; the mass is filtered, the filtrate oxidized by blowing in air and again filtered; the solid matter is washed neutral and dried. The dyestuff thus obtained is a 4-benzoylamino-1-α-naphthanthraquinone acridone of the formula

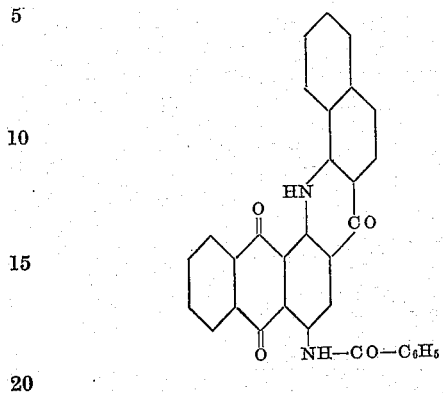

It is a dark powder which dyes cotton very fast and level greenish gray in a violet red vat, the sulfuric acid solution is orange and when poured into water yields green-gray flocks. Similar products are obtained when using the corresponding 4-(4'-chloro)-benzoylaminoanthraquinone or 4-(3'-methoxy)-benzoylaminoanthraquinone derivatives instead of the 1-(α₁-1-naphthylamino-β₁-carboxylic acid-ethyl ester)-4-benzoylaminoanthraquinone, or exchanging the aroyl radicals of the benzene series for other acyl radicals, such as those of the phenoxy-acetic acid or of the furane carboxylic acid.

The 1-(α₁-naphthylamino-β₁-carboxylic acid ethyl ester)-4-benzoylaminoanthraquinone may be made as follows:

34.2 parts of 1-amino-4-benzoylaminoanthraquinone, 23.4 parts of 1-chloronaphthalene-2-carboxylic acid ethyl ester, 12 parts of anhydrous sodium carbonate and 0.6 part of anhydrous cupric chloride are mixed together in 240 parts of nitrobenzene and the mixture is boiled for 20 hours under reflux. When the mixture is cooled it is filtered and the solid matter is washed with a little nitrobenzene, then with toluene and alcohol and finally with water and then treated with hydrochloric acid, washed neutral and dried.

The crystalline blue body thus obtained is a 1-(α₁-naphthylamino-β₁-carboxylic acid ethyl ester)-4-benzoylaminoanthraquinone. It dissolves to an olive brown solution in sulfuric acid; when this solution is poured into water yellow brown flocks are produced.

The 4-benzoylamino-α:α'-naphthanthraquinoneacridone can also be produced by condensing the 1-(α₁-naphthylamino-β₁-carboxylic acid)-4-benzoylaminoanthraquinone as indicated in Example 1.

An isomeric 5-benzoylamino-α:α'-naphthanthraquinoneacridone which dyes brown tints from a violet vat can be obtained from 1-amino-5-benzoylaminoanthraquinone.

*Example 3*

10 parts of 1:5-(di-α₁-naphthylamino-β₁-carboxylic acid ethyl ester)-anthraquinone in finely subdivided form are vatted in a solution of 600 parts of water, 100 parts of pyridine, 15 parts of sodium hydrosulfite and 35 parts of sodium hydroxide solution of 30 per cent. strength for 1 hour at 30–40° C., ring closure occurs to produce the dinaphthacridone. The whole is filtered from a little residue and the filtrate is oxidized by passing air through it at 30–40° C. When the oxidation of the dyestuff is complete the latter is filtered, washed and dried. There is obtained the diacridone of the probable formula

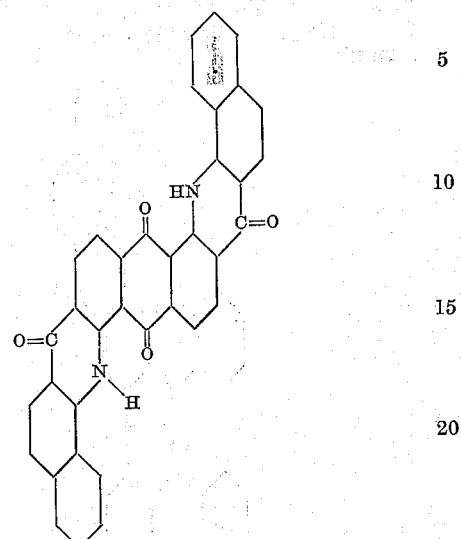

in the form of a bluish gray powder which yields a violet vat dyeing cotton a very fast gray. The solution in sulfuric acid is orange and when poured into water yields violet gray flocks.

The 1:5-(di-α₁-naphthylamino-β₁-carboxylic acid ethyl ester)-anthraquinone may be made as follows:—

A mixture of 23.8 parts of 1:5-diaminoanthraquinone, 47 parts of 1-chloronaphthalene-2-carboxylic acid ethyl ester, 24 parts of anhydrous sodium carbonate and 1 part of anhydrous cupric chloride is added to 200 parts of nitrobenzene and the whole is boiled for 20 hours under reflux. The operation of working up is the same as that described in Example 2. The crystallized red body dissolves in sulfuric acid to an olive solution and is precipitated therefrom by water in a yellow red form.

*Example 4*

10 parts of the compound of the formula

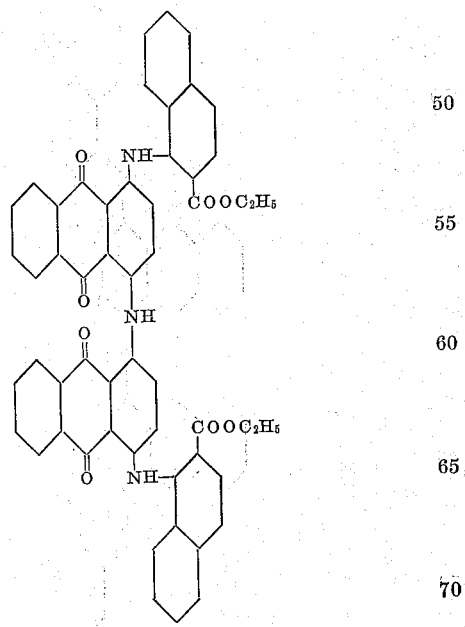

are vatted in a finely subdivided form in a solution of 600 parts of water, 100 parts of pyridine, 21 parts of sodium hydrosulfite and 50 parts of sodium hydroxide solution of 30 per cent. strength for 1 hour at 40–50° C. After filtration the dyestuff is precipitated from the filtrate by blowing in air; it is filtered, washed neutral and dried. The dark green diacridone thus obtained of the formula

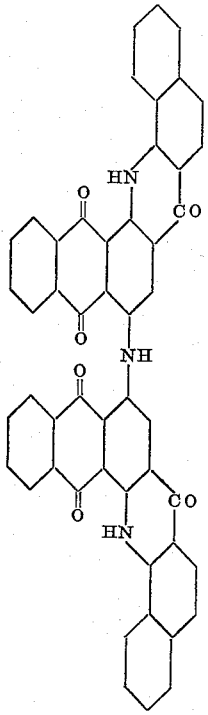

dissolves in sulfuric acid to an olive solution and when precipitated therefrom by water forms green flocks. Cotton is dyed green in a red vat.

10 parts of the above diacridone from 4:4′-diamino-1:1′-dianthraquinonylamine are introduced at ordinary temperature into 150 parts of sulfuric acid of 66° Bé., the whole is stirred for some hours at 30–40° C., then poured onto ice, sucked off, washed neutral, and dried.

The dyestuff thus obtained, probably the carbazol of the formula

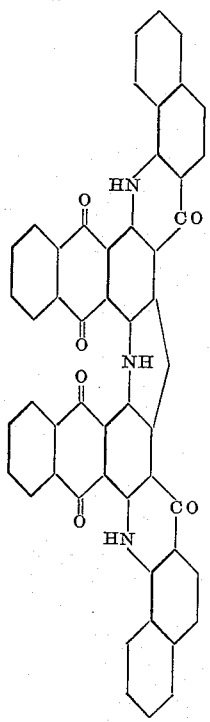

dissolves in concentrated sulfuric acid to a blackish-blue solution and dyes cotton from a warm vat olive tints.

The parent material for this example is made as follows:—

22.8 parts of 4:4′-diamino-1:1′-dianthraquinonylamine, 23.6 parts of 1-chloronaphthalene-2-carboxylic acid ethyl ester, 12 parts of anhydrous sodium carbonate and 0.6 part of anhydrous cupric chloride are added to 240 parts of nitrobenzene and the whole is boiled for 20 hours under reflux. After cooling a small quantity of impurities is filtered from the solution and the latter is washed with nitrobenzene and the filtrate freed from nitrobenzene by steam, again filtered and the solid matter is washed until neutral and dried. The new condensation product is thus obtained in the form of a dark powder.

*Example 5*

26 parts of 5-aminoanthraquinone-1:1′:2:2′-naphthacridone of the formula

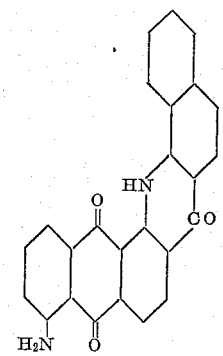

(obtained by saponification of the corresponding benzoylamino compound in sulfuric acid of 66° Bé. at 90° C.) are boiled for 20 hours in a reflux apparatus with 17.2 parts of 1-chloroanthraquinone, 8 parts of anhydrous sodium carbonate, and 0.4 part of anhydrous copper chloride in 250 parts by weight of nitrobenzene. After cooling the mixture is sucked off, washed with little nitrobenzene, then with toluene and alcohol and finally with water, until neutral and then dried.

The new condensation product thus obtained of the formula

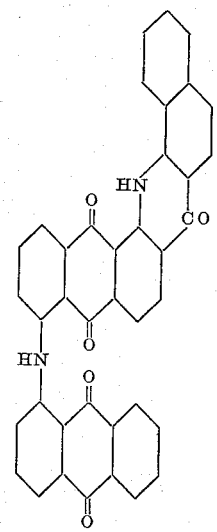

dissolves in concentrated sulfuric acid to brown-orange solutions. When precipitated in water there are formed violet flocks. Cotton is dyed from a red vat brownish-violet tints.

10 parts of this condensation product are introduced at 140° C. into a mixture from 80 parts of aluminium chloride and 20 parts of sodium chloride, the whole is stirred for ½ hour at 140–150° C., taken up in water and hydrochloric acid, heated to the boil, filtered hot and washed neutral while hot, and then dried.

The carbazol thus obtained of the formula

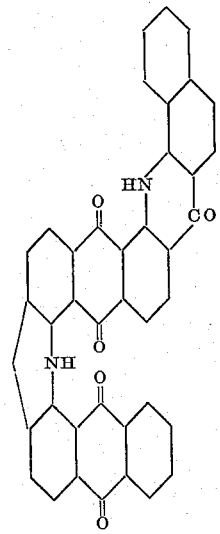

dissolves in concentrated sulfuric acid to redbrown solutions; when precipitated in water there are formed brown flocks. Cotton is dyed from violet-brown vat fast brown tints.

*Example 6*

10 parts of a dicarboxylic acid of the formula

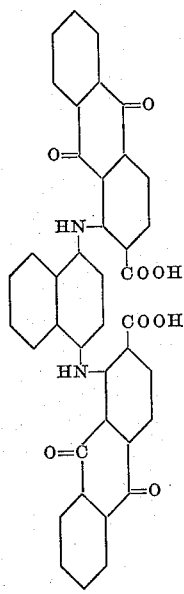

are treated in 160 parts of toluene with 7 parts of phosphorus pentachloride for 1 hour at 50–55° C.; the whole is then boiled for ¼ hour under reflux. After cooling the mass is filtered and the solid matter washed with toluene and alcohol and finally with water until neutral; it is then dried.

The dark brown condensation product of the formula

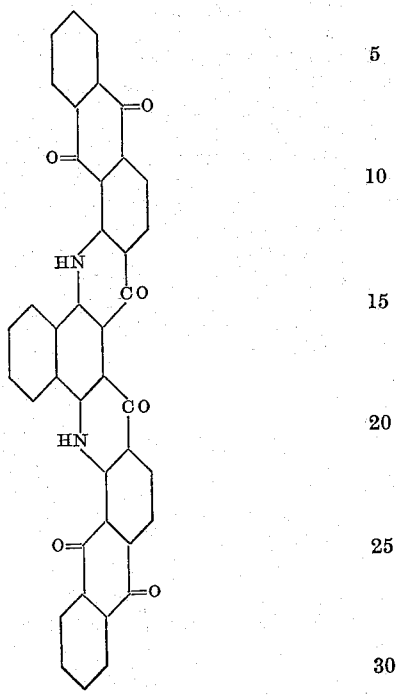

dissolves in sulfuric acid to a brown solution which when poured into water yields brown flocks. This vat dye is red; cotton is dyed red brown tints by it.

The compound here used as parent material may be made as follows:—

16 parts of 1:4-dichloronaphthalene, 48 parts of 1-aminoanthraquinone-2-carboxylic acid ethyl ester, 20 parts of anhydrous sodium carbonate and 0.8 part of cupric chloride are added to 160 parts of nitrobenzene and the whole is boiled for 20 hours under reflux. After cooling the mass is filtered from impurities and the filtrate distilled with steam to separate the nitrobenzene. The residue is filtered and the solid matter is washed with hot water and dried. The dark brown condensation product thus obtained dissolves in sulfuric acid to a brown solution which when poured into water yields brown flocks.

The free dicarboxylic acid is obtainable by treating the above diester in alcohol with caustic soda solution.

*Example 7*

0.5 part of the dyestuff made as described in Example 2 is formed into a paste with 3 volumes of caustic soda solution of 36° Bé. and 100 parts of water at 25–30° C.; there is then added 1 part of hydrosulfite powder conc. and the vatting proceeds for ½ hour at the above temperature.

The dye bath is prepared as follows:

900 parts by volume of liquor, 1 mol. of caustic soda solution of 36° Bé. and 0.5 part of hydrosulfite conc. Into this bath is poured the vatted dyestuff and dyeing is continued for 1 hour at 40–50° C. After dyeing the goods are wrung out, oxidized in the air, rinsed and developed with 5 parts of soap, 2 parts of anhydrous sodium carbonate per litre for ½ hour at boiling temperature. Cotton is dyed fast greenish gray tints.

*Example 8*

0.5 part of the dyestuff described in Example 3 is heated at 50–60° C. with 6 parts by volume of caustic soda solution of 36° Bé. and 100 parts of water; there is then added 1 part of hydrosulfite conc. powder at 50–60° C. Reduction is continued for 20 minutes. The dye bath consisting of 900 parts of water is mixed with 6 parts by volume of caustic soda solution of 36° Bé. and 0.5 per cent. of hydrosulfite conc. at 50–60° C. and then the vatted dyestuff is added. 50 parts of cotton are now entered and handled for 1 hour at 50–60° C. The dyed goods are then wrung out and oxidized in the air for ½ hour. After the oxidation the goods are rinsed well with water and developed for ½ hour with 5 parts of soap and 2 parts of anhydrous sodium carbonate. The cotton is dyed fast gray.

What we claim is:—

The dyestuff of the formula

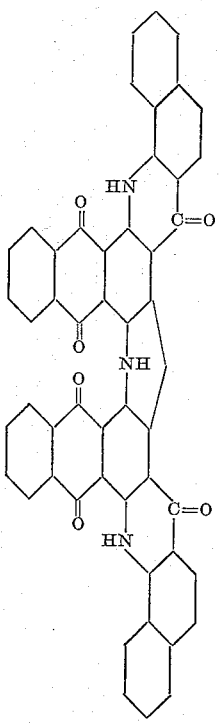

which product is a dark powder, dissolving in sulfuric acid to a blackish blue solution and in water with addition of hydrosulfite and caustic soda solution to a brown solution, and dyeing cotton from the vat fast level olive tints.

WILHELM MOSER.
WALTER FIORONI.